United States Patent
Stineman, Jr. et al.

(10) Patent No.: US 7,356,588 B2
(45) Date of Patent: Apr. 8, 2008

(54) CIRCUITS AND METHODS FOR DETECTING THE PRESENCE OF A POWERED DEVICE IN A POWERED NETWORK

(75) Inventors: John A. Stineman, Jr., Carpinteria, CA (US); Jacob Herbold, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 407 days.

(21) Appl. No.: 10/738,824

(22) Filed: Dec. 16, 2003

(65) Prior Publication Data

US 2005/0132240 A1   Jun. 16, 2005

(51) Int. Cl.
G06F 1/26 (2006.01)
(52) U.S. Cl. .................. 709/224; 713/300; 341/155; 341/156
(58) Field of Classification Search ................ 709/223, 709/224, 225; 363/13, 18, 21.01, 21.09, 363/21.17, 131; 323/274, 277; 324/539, 324/606, 537; 713/300; 340/870.37
See application file for complete search history.

(56) References Cited

U.S. PATENT DOCUMENTS

| | | | | |
|---|---|---|---|---|
| 4,339,750 | A * | 7/1982 | Delacruz | 340/870.37 |
| 5,406,260 | A | 4/1995 | Cummings et al. | |
| 5,596,280 | A * | 1/1997 | Riggio, Jr. | 324/606 |
| 6,218,930 | B1 | 4/2001 | Katzenberg et al. | |
| 6,525,515 | B1 * | 2/2003 | Ngo et al. | 323/277 |
| 7,057,899 | B2 * | 6/2006 | AbuGhazaleh et al. | 361/780 |
| 2003/0146765 | A1 * | 8/2003 | Darshan et al. | 324/539 |
| 2003/0156433 | A1 * | 8/2003 | Gong et al. | 363/18 |
| 2004/0073597 | A1 * | 4/2004 | Caveney et al. | 709/200 |
| 2004/0236967 | A1 * | 11/2004 | Korcharz et al. | 713/300 |

OTHER PUBLICATIONS

Dwelley, Dave "New Power for Ethernet-The LTC4255 Delivers (Part 1 of a 3-part series)", Linear Technology, Aug. 2002, vol. XII, No. 3, pp. 9-11.
Dwelley, Dave, "New Power for Ethernet-Powered Devices (Part 2 of a 3-part series)", Linear Technology, Dec. 2002, vol. XII, No. 4, pp. 9-10, 27.
Dwelley, Dave "New Power for Ethernet-Detection and Classification (Part 3 of a 3-part series)", Linear Technology, Jun. 2003, vol. XIII, No. 2, pp. 9-10, 14.
Hochmuth, Phil, "In-line Power Gear Set to Grow". Network World Fusion [online], Aug. 8, 2002 [retrieved on May 7, 2004] pp. 1-3. Retrieved from the Internet:<URL http://www.nwfusion.com/news/2002/134543_Aug. 5, 2002.html>.

(Continued)

*Primary Examiner*—Nathan Flynn
*Assistant Examiner*—Jude J Jean-Gilles
(74) *Attorney, Agent, or Firm*—McDermott Will & Emery LLP

(57) ABSTRACT

Circuits and methods for detecting the presence of a powered device in a powered network connection and removing power from the powered network connection when no powered device is present are disclosed. The circuits and methods involve applying a time-varying voltage signal into an analog amplifier circuit that converts the voltage into a current indicative of the impedance of the connection. The analog amplifier circuit may be implemented with a dual-output trans-conductance amplifier that provides a digital voltage to indicate the removal of the powered device from the powered network connection.

38 Claims, 7 Drawing Sheets

OTHER PUBLICATIONS

IEEE 802.3af Power Over Ethernet: A Radical New Option for Connecting Embedded Computers, Retrieved from Internet: <URL: www.PowerOverEthernet.com>, date and author unknown.

"LTC4257: IEEE 802.3af PD Power Over Ethernet Interface Controller". Datasheet, Linear Technology [online], 2003, Linear Technology Corporation.

Lan Man Standards Committee (of the IEEE Computer Society), IEEE Draft P802.3af/D4.3 Amendment: Data Terminal Equiptment (DTE) Power via Media Dependent Interface (MDI), Apr. 2003.

Robinson, Mike, "Watts on Way for Ethernet", IEEE Spectrum [online], [retrieved on Jul. 30, 2003] pp. 1-3. Retrieved from Internet:<URL:http://www.spectrum.ieee.org/WEBONLY/resource/mar03/won802.html>.

Sturdevant, Cameron "802.3af Specification Makes a Lot of Sense". EWeek [online], Sep. 23, 2002 http://www.eweek.com/article2/0,3959,547644,00.asp>.

* cited by examiner

CIRCUITS AND METHODS FOR DETECTING THE PRESENCE OF A POWERED DEVICE IN A POWERED NETWORK

FIELD OF THE INVENTION

This invention relates generally to a circuit and method for managing power distribution to a powered network. More specifically, the present invention provides a circuit and method for detecting the presence of a powered device in a powered network connection and removing power from the powered network connection when no powered device is present.

BACKGROUND OF THE INVENTION

A data communications network is a collection of hardware and software that uses communications channels to share data and information between users and devices connected to the network. Millions of users worldwide connect to a data communications network on a daily basis for accessing information, shopping, recreation, and conducting business. Examples of data communications networks include wired networks such as local area networks at a home or place of business and wide area networks such as the Internet, as well as local and wide area wireless networks such as Bluetooth and 802.11 networks.

Users may access a data communications network with a variety of network devices, which are electronic devices configured with a network access system, such as personal and portable computers, electronic organizers, personal digital assistants ("PDAs"), entertainment systems, stereo systems, video game units, household appliances, or other embedded electronic devices. All of these devices currently require a local source of power to operate when connected to a data communications network.

With the adoption of the recently established 802.3af Ethernet standard, commonly known as the "Power over Ethernet" ("PoE") standard, it is expected that powered networks will become more widespread. Powered networks carry data and provide DC power to a whole new class of "powered devices" ("PDs"), all of which will not require additional AC wiring or external power sources to connect to the powered network.

The power is provided by a device called a "Power Sourcing Equipment" ("PSE") that is typically placed in an Ethernet hub, switch, router, or other network equipment. PDs may include digital IP telephones, wireless network access points, PDA or portable computer docking stations, cell phone chargers, HVAC thermostats, or almost any network device that can run from the DC power provided by the powered network.

The power is typically applied as a common mode voltage difference between two powered wire pairs, by powering the center taps of the isolation transformers used to couple the differential data signals to the wires. As the powered network data lines are transformer-isolated at each end of a wire, the potential difference between the transmit pair and the receive pair has no effect on the data transceivers at either end of the wire.

PSEs contain a detection mechanism to detect the presence of a PD at a network port prior to sending power to it and to prevent sending power and causing permanent damage to devices that are non-compliant with the PoE standard, i.e., devices that are not designed to receive power from the powered network such as the currently-available personal and portable computers. The detection mechanism involves probing the network cable for a "PD signature" before applying voltage to the wire.

Once the power is on, the PSE must keep it on as long as the PD presents a valid "power maintenance signature". The power maintenance signature specified in the PoE standard, for example, consists of a minimum DC current draw of at least 10 mA and an AC impedance at or lower than 27 k$\Omega$ at all frequencies from DC to 500 Hz. The. PSE can opt to monitor either or both components of this power maintenance signature to determine if the PD is still present at the network port. If the PSE determines that a PD has removed its power maintenance signature indicating that the PD is no longer connected to the network cable, the PSE removes power from the network to prevent power from being delivered to a non-compliant device that may eventually be inserted into the same network port.

Accordingly, the PoE standard specifies two methods for probing a network connection for a power maintenance signature and removing power from the network if the power maintenance signature is no longer present: (1) a "DC disconnect" method, that involves monitoring a minimum DC current draw of at least 10 mA; and (2) an "AC disconnect" method, that involves monitoring the AC impedance of the network port.

The DC disconnect method involves the use of a current monitoring circuit in the PSE for monitoring the current flow through the network connection by measuring a return current DC signal. If the current monitoring circuit determines that the return current DC signal dropped below the minimum allowed current level of 10 mA, thereby signifying that a PD has been unplugged from the network port or that the PD has removed its power maintenance signature, the PSE removes the power supplied to the network.

Alternatively, the AC disconnect method involves the use of an AC disconnect sensing circuit for imposing a time varying signal that is capacitively coupled to the connection on top of the voltage that is powering the PD and using this time-varying signal to measure the AC impedance of the network port. As specified by the PoE standard, a PD is considered present at the network port if the AC impedance of the network port is equal to or lower than 27 k$\Omega$. Conversely, a PD may be considered unplugged from the network port if the AC impedance of the network port is greater than a threshold set above 27 k$\Omega$. The PoE standard further specifies that a PD must be considered unplugged from the network if the AC impedance of the network port is equal to or greater than 1980 k$\Omega$. The PSE removes the power supplied to the network when a PD has been unplugged from the network, i.e., when the power maintenance signature is no longer present. The AC disconnect sensing circuit may be located either at the endpoint of the network link or at the center of the link, commonly referred to as "midspan".

A problem relating to the AC disconnect threshold specified by the PoE standard is that the capacitance of the network cable due to combinations of long cable runs, connectors, patch panels, outlet boxes and other equipment used to carry data may be high enough for the pair to pair impedance between the PSE and the PD to indicate that a PD is present at the network port when, in fact, it has been removed. That is, the AC disconnect sensing circuit may measure an AC impedance that is due to the pair to pair reactive impedance of the cable instead of the AC impedance indicative of the presence or absence of a PD. As a result, the AC disconnect sensing circuit may inadvertently maintain the power delivery to the network regardless of whether a PD is present or not, with the potential to permanently damage a non-compliant device that may eventually be inserted into the network-port later in the absence of a PD.

Additionally, as the PSE supplies power to the network at a DC voltage, it necessarily has a low output impedance that would prevent an AC disconnect sensing circuit from measuring anything other than the PSE's output impedance. To mitigate this problem, a coupling diode is inserted in series with the PSE to enable the AC disconnect sensing circuit to disregard the PSE's output impedance. However, the PSE output impedance may be disregarded only when the AC disconnect sensing circuit measures the AC impedance of the network port when the coupling diode is reverse biased. Otherwise, the AC disconnect sensing circuit would measure the impedance of the coupling diode instead of the impedance of the network port. And even when the AC impedance is measured when the coupling diode is reverse biased, the PSE bypass capacitance required by the PoE standard to meet its specifications for stability, ripple, and load regulation may still contribute to the AC impedance of the connection. As a result, the AC disconnect sensing circuit may measure an impedance that is not due solely to the presence of a PD in the network port.

Another constraint is that the PoE standard requires the AC disconnect sensing circuit to operate at less than 500 Hz, thus slewing the network port voltage to less than 100 V/ms and 4.4 V peak-to-peak. To meet this low slew rate and low frequency signal requirement, the AC coupling capacitor must be close to 1 μF and be able to handle 60 V of DC bias.

In view of the foregoing, it would be desirable to provide circuits and methods for detecting the presence of a powered device in a powered network connection and removing power from the powered network connection when no powered device is present.

It further would be desirable to provide circuits and methods for measuring the AC impedance of a powered network connection and determining whether to remove power from the connection based on the measured AC impedance.

It also would be desirable to provide circuits and methods for measuring the AC impedance of a powered network connection and distinguishing between the impedance of the connection due to the network cable, PSE bypass capacitance, and coupling diode and the impedance of the network port indicative of the presence or absence of a PD.

SUMMARY OF THE INVENTION

In view of the foregoing, it is an object of the present invention to provide circuits and methods for detecting the presence of a powered device in a powered network connection and removing power from the powered network connection when no powered device is present.

It is a further object of the present invention to provide circuits and methods for measuring the AC impedance of a powered network connection and determining whether to remove power from the connection based on the measured AC impedance.

It is also an object of the present invention to provide circuits and methods for measuring the AC impedance of a powered network connection and distinguishing between the impedance of the connection due to the network cable, PSE bypass capacitance, and coupling diode and the impedance of the network port indicative of the presence or absence of a PD.

These and other objects of the present invention are accomplished by providing an AC disconnect sensing circuit and methods for detecting the presence of a powered device in a powered network connection and removing power from the powered network connection when no powered device is present. The powered network connection may be a powered Ethernet connection compliant with the PoE standard, or any other powered network connection that requires a sensing circuit for detecting the presence of a powered device in the connection. A powered device ("PD") may be a digital IP telephone, a wireless network access point, a PDA or a portable computer docking station, a cell phone charger, an HVAC thermostat, or almost any network device that can connect to a network port and run from the DC power provided by the powered network with a power sourcing equipment ("PSE").

In a preferred embodiment, the AC disconnect sensing circuit applies a time-varying voltage signal on a coupling capacitor and senses the peak current that flows through the coupling capacitor to determine whether the AC impedance of the network port exceeds a threshold set above 27 kΩ, thereby indicating that a PD has been unplugged from the network or that the PD has removed its power maintenance signature. When the AC impedance of the network port is above the threshold, the power supplied to the connection is removed by the PSE. The time-varying voltage signal may be a sine wave, trapezoidal wave, or any other cyclic controlled slope waveform.

The AC disconnect sensing circuit includes an analog amplifier circuit for driving a time-varying voltage signal on its input into the network load formed by the PSE bypass capacitance, the network cable capacitance, the coupling capacitor, the coupling diode and the PD, and sensing the peak current flowing through the coupling capacitor. The analog amplifier circuit may be a buffer amplifier, an operational amplifier, a dual-output operational trans-conductance amplifier ("DO-OTA"), or any other analog amplifier that may be used for driving a time-varying voltage signal into a resistive and a reactive load.

In a preferred embodiment, the analog amplifier circuit is implemented as a DO-OTA that provides a digital output that may be readily interfaced to other circuits and that indicates when the impedance of the connection exceeds a threshold set above 27 kΩ, thereby indicating when a PD has been unplugged from the network.

The peak current is preferably sensed when the coupling diode in series with the PSE is reverse biased to enable the AC disconnect sensing circuit to disregard the PSE's output impedance and the diode impedance when determining the AC impedance of the network port. When the coupling diode is reverse biased, it becomes an open circuit with near-zero impedance thereby enabling the peak current flowing through the coupling capacitor to depend only on the coupling capacitance, cable capacitance, and the PSE bypass capacitance. The resistive load in the PD may be largely ignored since the current flowing through the resistive load in the PD is out of phase with the peak current flowing through the coupling capacitor. As described hereinbelow, the relationship between the peak current flowing through the coupling capacitor and the coupling capacitance, cable capacitance, and the PSE's bypass capacitance depends on whether a PD is connected to the network port or not.

When a PD is connected to the network port, its input bypass capacitance is much higher than the coupling capacitance so the network connection is effectively AC grounded. In this case, the overall total capacitance in the network load may be primarily due to the coupling capacitance. When a PD is not connected to the network port, the cable capacitance and the PSE's bypass capacitance may be a significant component in the AC impedance of the connection. In this case, the overall total capacitance of the network load is a combination of the coupling capacitance, cable capacitance, and PSE's bypass capacitance.

The values of the coupling capacitance, PSE's bypass capacitance, and peak voltage of the time-varying voltage signal are selected to ensure that when no PD is connected to the network port, the sensed peak current will have a value that depends primarily on the coupling capacitance and that, when divided into the peak time-varying voltage, results in an AC impedance that is well above the PoE standard requirement of 27 k$\Omega$. The values of the coupling capacitance, PSE's bypass capacitance, and peak voltage of the time-varying voltage signal are also selected to satisfy the PoE standard requirement that the AC disconnect sensing circuit operate at less than 500 Hz, thus slewing the network port voltage to less than 100 V/ms and 4.4 V peak-to-peak. To meet this low slew rate and low frequency signal requirement, the AC coupling capacitor must be close to 1 $\mu$F and be able to handle 60 V of DC bias.

For example, for a frequency of 100 Hz and a peak-to-peak voltage of 6 V, the PSE's bypass capacitance may be chosen at 0.1 $\mu$F, the coupling capacitance may be chosen at 0.5 $\mu$F, and the cable capacitance may be estimated at 0.05 $\mu$F. As described hereinbelow, choosing these design parameters will result in a peak current flowing through the coupling capacitor to be approximately 0.22 mA when no PD is connected to the network port and approximately 0.9 mA when a PD is connected to the network port. At these values, the AC impedance of the network port will therefore be above the 27 k$\Omega$ threshold set by the PoE standard when no PD is connected to the network port and below the 27 k$\Omega$ when a PD is connected to the network port.

Advantageously, the present invention provides a simple AC disconnect sensing circuit for use with powered network connections such as those compliant with the PoE standard that detect the presence of a powered device in the powered network connection and remove power from the powered network connection when no powered device is present, without running the risk of damaging non-compliant devices that may eventually be inserted into the connection with unnecessary power.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
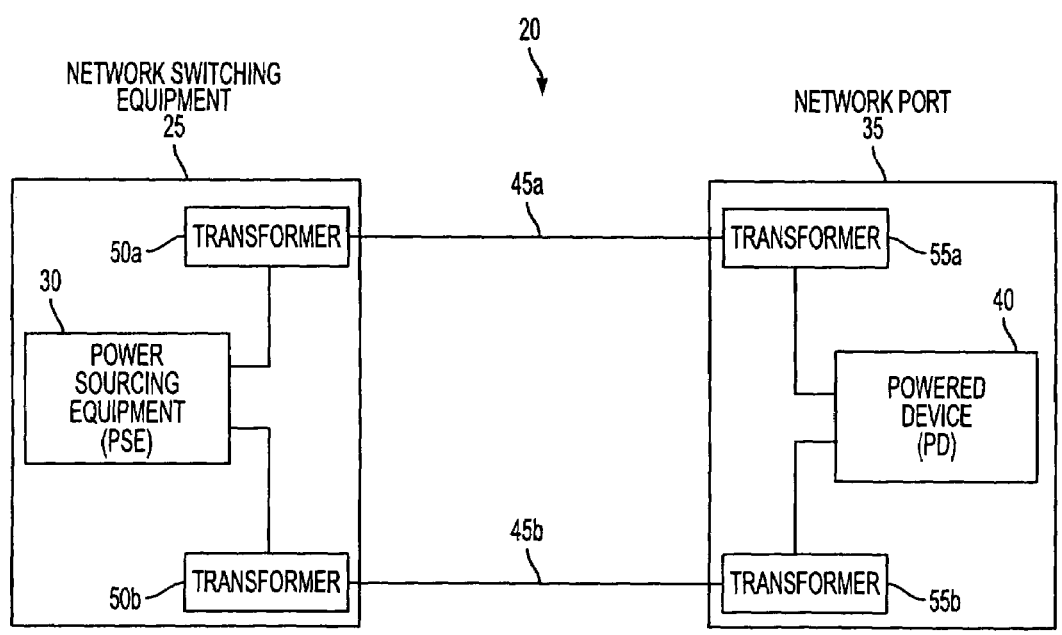
FIG. 1A is an illustrative diagram of an exemplary powered network connection.

Referring to FIG. 1A, an illustrative diagram of an exemplary powered network connection is described. Powered network connection 20 is composed of network switching equipment 25, powered end station 35, and network cables 45a-b. Network switching equipment 25 may be a network repeater, switch, router, hub, data terminal equipment, or other network equipment involved in the data transmission path. Network switching equipment 25 includes power sourcing equipment ("PSE") 30 to provide DC power to network port 35. Powered device ("PD") 40 connects to network port 35 and either requests or draws power from PSE 30 through network cables 45a-b. Network cables 45a-b may be CAT-3 or CAT-5 Ethernet cables, or any other cable compliant with the PoE standard.

The power supplied by PSE 30 is applied as a common mode voltage difference between data pair transformers 50a-b of network cables 45a-b. PSE 30 searches powered network connection 20 for a powered device such as PD 40, supplies power to PD 40 only if PD 40 is detected on powered network connection 20, monitors the power supplied on powered network connection 20, and removes power from powered network connection 20 when no PD is present.

PSE 30 implements a detection algorithm specified in the PoE standard for detecting the presence of PD 40 in powered network connection 20 prior to sending power to it. PSE 30 is able to distinguish between an open connection, a non-compliant network appliance, or a valid PD. The detection algorithm involves probing network cables 45a-b for a valid "PD signature" before applying voltage to the cables.

Once the power is supplied to PD 40, PSE 30 must maintain the power as long as PD 40 provides a valid "power maintenance signature" at network switching equipment 25. The power maintenance signature specified in the PoE standard, for example, consists of a minimum DC current draw of at least 10 mA and an AC impedance lower than 27 k$\Omega$ at all frequencies from DC to 500 Hz. If PSE 30 determines that PD 40 has removed its power maintenance signature indicating that PD 40 is no longer present at network port 35 such as by determining that the AC impedance of network port 35 is greater than a threshold set above 27 k$\Omega$, PSE 30 removes power from network cables 45a-b to prevent power from being delivered to a non-compliant device that may eventually be connected to network port 35.

In accordance with the principles of the present invention, PSE 30 detects the presence of a valid power maintenance signature by monitoring the AC impedance of network port 35 as described below with reference to FIG. 3. PSE 30 may also detect the presence of a valid power maintenance signature by monitoring the DC current draw at network cables 45a-b.

Figure 1B:
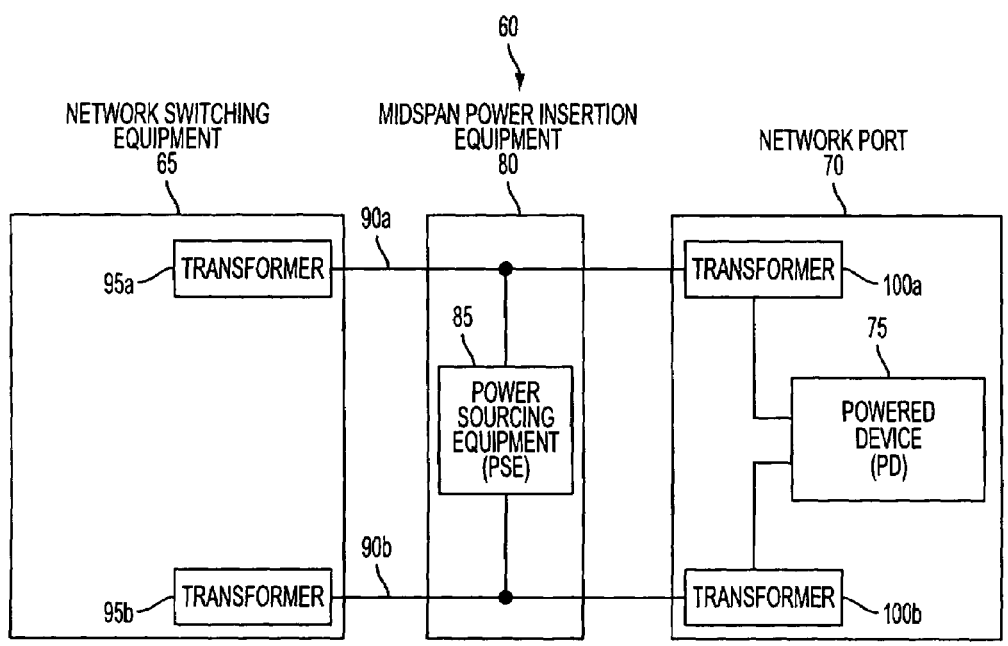
FIG. 1B is an illustrative diagram of another exemplary powered network connection.

Referring now to FIG. 1B, an illustrative diagram of another exemplary powered network connection is described. Powered network 60 includes network switching equipment 65, midspan power insertion equipment ("MPIE") or power hub 80, network port 70, and network cables 90a-b. Similar to network switching equipment 25 shown in FIG. 1A, network switching equipment 65 may be a network repeater, switch, router, hub, data terminal equipment, or other network equipment involved in the data transmission path. MPIE 80 includes PSE 85 to provide power to network port 70. PD 75 connects to network port 70 and either requests or draws power from PSE 85 through network cables 90a-b. Similar to network cables 45a-b shown in FIG. 1A, network cables 90a-b may be CAT-3 or CAT-5 Ethernet cables, or any other cable compliant with the PoE standard. PSE 85 performs the same functions of PSE 30 as described above. It should be understood by one skilled in the art that MPIE 80 may include one or more PSEs.

Figure 2:
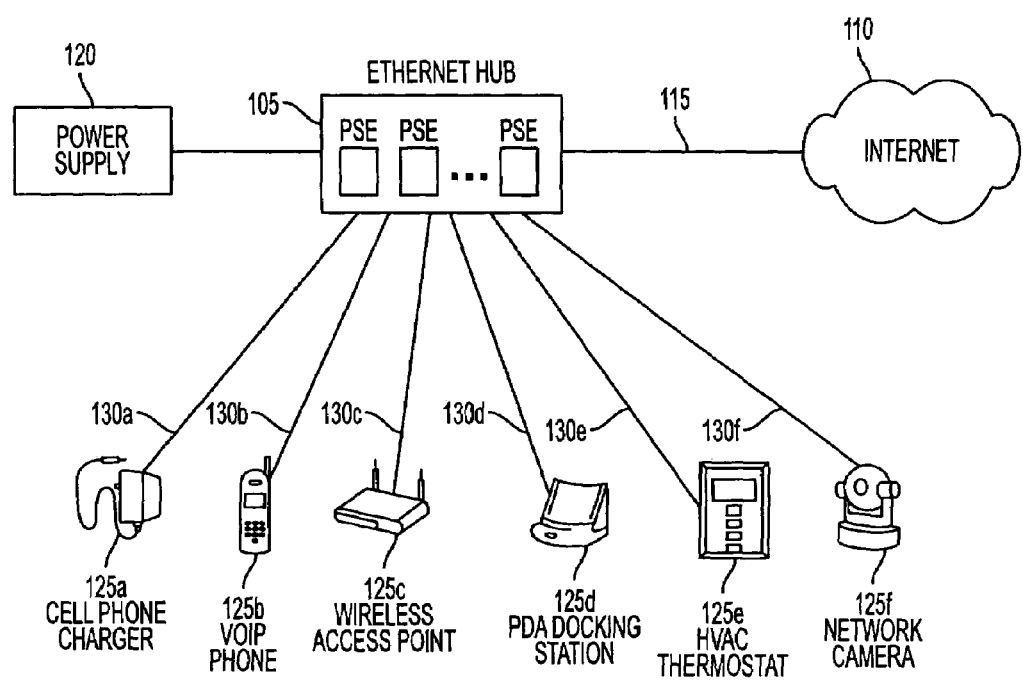
FIG. 2 is an illustrative diagram of exemplary powered devices connected to a powered network connection.

Referring now to FIG. 2, an illustrative diagram of exemplary powered devices connected to a powered network connection is described. Ethernet hub 105 is connected to Internet 110 with Ethernet cable 115. Ethernet hub 105 or other network aggregator may be a powered hub such as 25 in FIG. 1A or a un-powered hub combined with a MPIE (65 and 80 in FIG. 1B). Ethernet hub 105 may include one or more PSEs to provide power to PDs 125a-f through Ethernet cables 130a-f. Ethernet hub 105 may be connected to backup power supply 120 to provide emergency power in case of AC line power failures.

PDs 125a-f may include cell phone charger 125a, VOIP phone 125b, wireless access point 125c, PDA or portable computer docking station 125d, HVAC thermostat 125e, or network camera 125f. It should be understood by one skilled in the art that other powered devices compliant with the PoE standard may also be connected to Ethernet hub 105 by means of an Ethernet cable such as Ethernet cables 130a-f.

Figure 3:
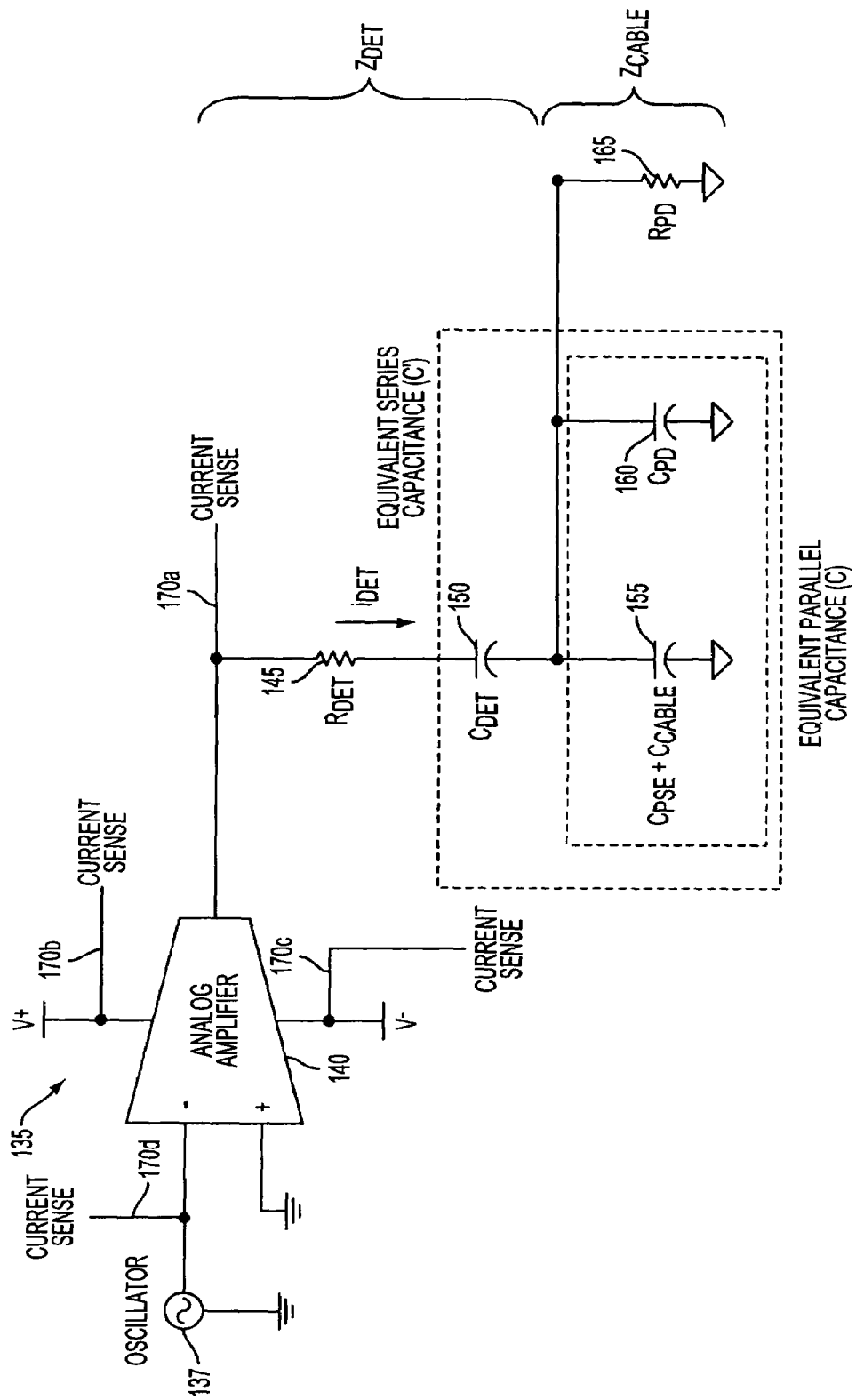
FIG. 3 is an illustrative diagram of an exemplary AC disconnect sensing circuit built in accordance with the principles of the present invention.

Referring now to FIG. 3, an illustrative diagram of an exemplary AC disconnect sensing circuit built in accordance with the principles of the present invention is described. AC disconnect sensing circuit 135 includes analog amplifier 140 for driving a time-varying voltage signal generated by oscillator 137 into the network load formed by PSE bypass capacitance and network cable capacitance 155, coupling capacitor 150, coupling diode 240 (FIG. 4) and PD 160-165, and sensing the peak current flowing through coupling capacitor 150. Analog amplifier 140 may be a buffer amplifier, an operational amplifier, a dual-output operational trans-conductance amplifier ("DO-OTA"), or any other analog amplifier that may be used for driving a time-varying voltage signal into a resistive and a reactive load.

The peak current is preferably sensed when diode 240 is reverse biased to enable AC disconnect sensing circuit 135 to disregard the PSE's output impedance and the diode impedance when determining the AC impedance of the connection. When coupling diode 240 is reverse biased, it becomes an open circuit with near-zero impedance thereby enabling the peak current flowing through coupling capacitor 150 to depend only on the coupling capacitance and on the cable and PSE's bypass capacitance (155). Resistive load 165 in the PD may be largely ignored since the current flowing through resistive load 165 in the PD is out of phase with the peak current flowing through coupling capacitor 150. As described hereinbelow, the relationship between the peak current flowing through coupling capacitor 150 and the coupling capacitance, cable capacitance, and the PSE's bypass capacitance depends on whether a PD is connected to the network port or not.

When a PD is connected to the network port, the equivalent capacitance of the network load formed by PSE's bypass capacitance and network cable capacitance 155 and PD (160-165) is given by:

$$C = C_{PSE} + C_{CABLE} + C_{PD}$$

The resistive impedance of the connection is negligible at the peak current flowing through coupling-capacitor $C_{DET}$ 150 since the current flowing through resistive load $R_{PD}$ 165 is 90° out of phase. Further, since PD input bypass capacitance $C_{PD}$ (160) is much higher than cable capacitance $C_{CABLE}$ and PSE's bypass cable capacitance (155), C will therefore be approximately equal to $C_{PD}$. That is, the equivalent parallel capacitance C of the network load formed by PSE's bypass capacitance and network cable capacitance 155 and PD 160-165 may be given by approximately:

$$C \cong C_{PD}$$

Consequently, the equivalent series capacitance C' of the network load formed by coupling capacitor 150 and equivalent parallel capacitance C may be given by:

$$\frac{1}{C'} = \frac{1}{C_{DET}} + \frac{1}{C_{PD}}$$

Since PD's input bypass capacitance $C_{PD}$ 160 is much higher than coupling capacitance $C_{DET}$ 150, the equivalent series capacitance C' of the network load may be given by approximately:

$$C' \cong C_{DET}$$

As a result, when a PD is connected to the network port, the network port may be seen as an AC ground and the current $i_{DET}$ flowing through the coupling capacitor may be sensed by:

$$i_{DET} \cong C_{DET} \frac{dV_{DET}}{dt}$$

where $V_{DET}$ is the voltage drop across coupling capacitor $C_{DET}$ 150. Ignoring any voltage drop across optional coupling resistor $R_{DET}$ 145, for a sine-wave time-varying voltage signal generated by oscillator 137, $V_{DET}$ may be given by:

$$V_{DET} \cong \frac{V_{PP}}{2} \sin(2\pi f t)$$

where the peak-to-peak amplitude $V_{PP}$ is given by the peak-to-peak amplitude of the time-varying voltage signal generated by oscillator 137 times any gain of analog amplifier 140.

Therefore, the peak current $I_{DET,PP,PD}$ through coupling capacitor $C_{DET}$ 150 when a PD is connected to the network port is given by:

$$i_{DET,PP,PD} \cong C_{DET} \frac{V_{PP}}{2} 2\pi f$$

When a PD is not connected to the network port, some of the $I_{DET}$ current flowing through coupling capacitor 150 causes a voltage drop across the network impedance given by cable capacitance $C_{CABLE}$ and PSE's bypass cable capacitance $C_{PSE}$ (155). The equivalent series capacitance C' of the network load in this case may then be given by:

$$\frac{1}{C'} = \frac{1}{C_{CABLE} + C_{PSE}} + \frac{1}{C_{DET}}$$

or $$C' = \frac{C_{DET}(C_{PSE} + C_{CABLE})}{C_{DET} + C_{PSE} + C_{CABLE}}$$

Therefore, the peak current $i_{DET,PP,NPD}$ through coupling capacitor $C_{DET}$ 150 when a PD is not connected to the network port is given by:

$$i_{DET,PP,NPD} \cong \frac{C_{DET}(C_{PSE} + C_{CABLE})}{C_{DET} + C_{PSE} + C_{CABLE}} \frac{V_{PP}}{2}(2\pi ft)$$

AC disconnect sensing circuit 135 implements the PoE standard specification to have power removed from the connection when the AC impedance of the connection is above 27 kΩ. This is achieved by selecting the values of coupling capacitor $C_{DET}$ 150, PSE's bypass capacitor $C_{PSE}$, and the peak voltage of the time-varying voltage signal to ensure that when no PD is present at the network connection, the sensed peak current $i_{DET,PP,NPD}$ results in an AC impedance that is well above the PoE standard requirement of 27 kΩ. The values of the coupling capacitance, PSE's bypass capacitance, and peak voltage of the time-varying voltage signal are also selected to satisfy the PoE requirement that the AC disconnect sensing circuit operate at less than 500 Hz, thus slewing the network port voltage to less than 100 V/ms and 4.4 V peak-to-peak. To meet this low slew rate and low frequency signal requirement, the AC coupling capacitor must be close to 1 µF and be able to handle 60 V of DC bias.

For example, for a frequency of 100 Hz and a peak-to-peak voltage of 6 V, the PSE's bypass capacitance may be chosen at 0.1 µF, the coupling capacitance may be chosen at 0.5 µF, and the cable capacitance may be estimated at 0.05 µF. Choosing these design parameters will result in a peak current flowing through the coupling capacitor to be approximately 0.22 mA when no PD is connected to the network port and approximately 0.9 mA when a PD is connected to the network port. At these values, the AC impedance of the network port will therefore be above the 27 kΩ threshold set by the PoE standard when no PD is connected to the network port and below the 27 kΩ when a PD is connected to the network port.

It should be understood by one skilled in the art that the peak current may be sensed directly at current sensing point 170a with an ammeter, current sensing resistor, or any other means for sensing current. Alternatively, the peak current may be determined indirectly at current sensing point 170b when diode 240 (FIG. 4) connected in series with the PSE is reverse biased. The peak current may be determined from the current at current sensing point 170b by, for example, measuring the variation in the amplifier supply current with the amplifier output current or by deriving the peak current based on the relationship between the amplifier supply current and the transistor currents of the internal transistors of analog amplifier 140.

It should be understood by one skilled in the art that the peak current may also be sensed at current sensing point 170c when diode 240 is forward-biased. In that case, AC disconnect sensing circuit design parameters formed by coupling capacitor $C_{DET}$ (150), PSE bypass capacitor $C_{PSE}$ and the time-varying voltage signal generated by oscillator 137 need to be carefully designed to account for the contributions of the diode impedance and the PSE's output impedance in the AC impedance of the network port to be determined from the sensed peak current flowing through coupling capacitor $C_{DET}$ 150. The peak current may be determined from the current at current sensing point 170c by measuring the variation in the amplifier supply current with the amplifier output current.

Further, it should also be understood by one skilled in the art that if analog amplifier 140 is implemented as an amplifier having a fixed gain, the peak current may also be determined by sensing the current at current sensing point 170d. In this case, the peak current may be determined by multiplying the current at current sensing point 170d by the gain of analog amplifier 140.

Figure 4:
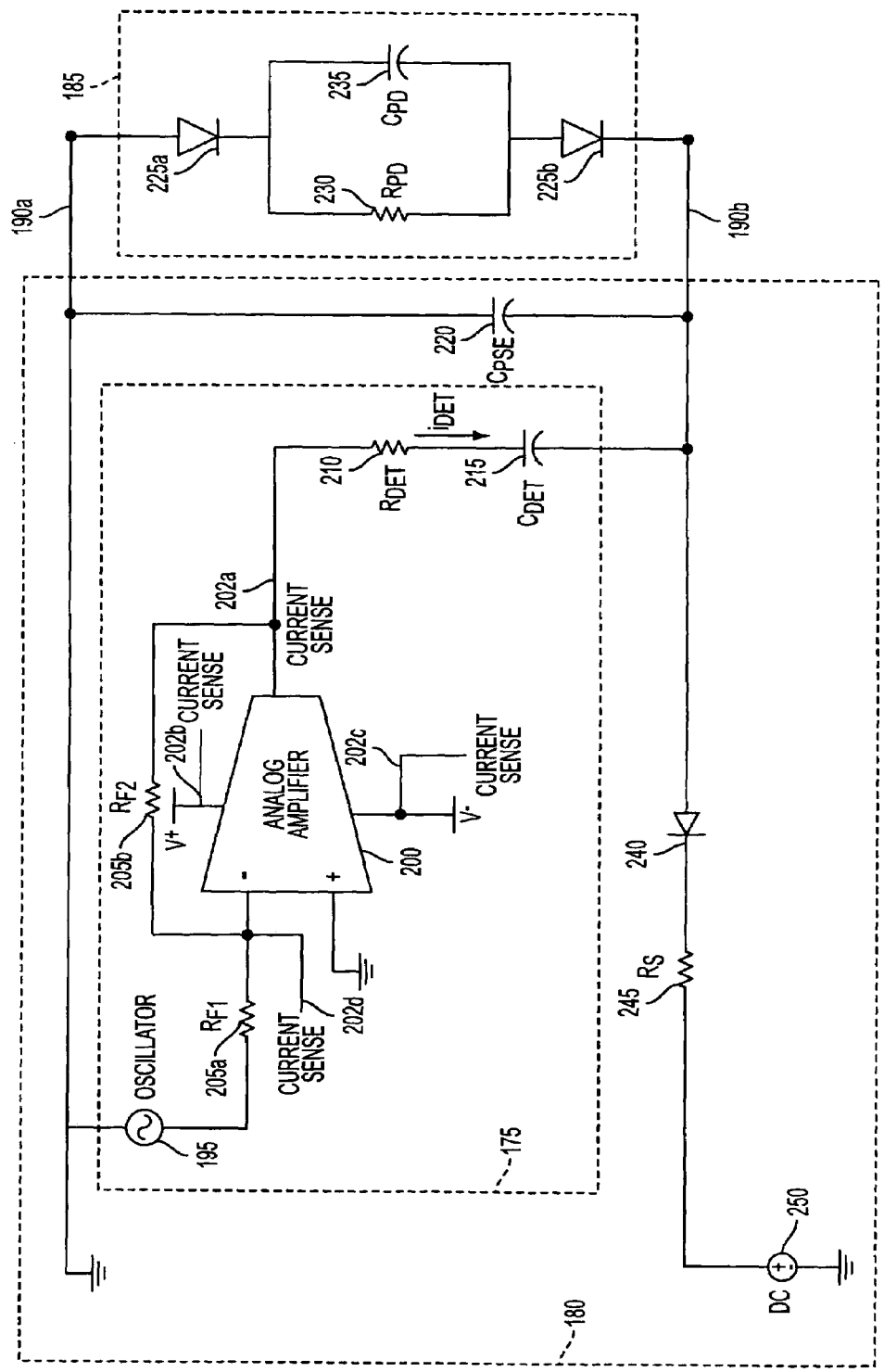
FIG. 4 is an illustrative diagram showing the exemplary AC disconnect sensing circuit of FIG. 3 connected to a powered network connection.

Referring now to FIG. 4, an illustrative diagram of an exemplary implementation of the AC disconnect sensing circuit of FIG. 3 connected to a powered network connection is described. AC disconnect sensing circuit 175 is included in PSE 180 to monitor the AC impedance of PD 185. If the AC impedance of PD 185 exceeds a threshold set above 27 kΩ as specified in the PoE standard, PSE 180 removes the power provided to the powered network connection formed by network cables 190a-b. Power to the network connection is supplied by power supply 250 included in PSE 180.

AC disconnect sensing circuit 175 includes oscillator 195 to provide a time-varying voltage signal to coupling capacitor $C_{DET}$ 215 by means of analog amplifier 200. The time-varying voltage signal may be a sine wave, trapezoidal wave, or any other cyclic controlled slope waveform. Analog amplifier 200 drives the time-varying voltage signal generated by oscillator 195 into the network load formed by PSE bypass capacitance (220), network cable capacitance, coupling capacitor 215, coupling diode 240 (FIG. 4) and PD 185, and sensing the peak current flowing through coupling capacitor 215.

As described hereinabove with reference to FIG. 3, the current $i_{DET}$ flowing through coupling capacitor 215 $i_{DET}$ depends on the coupling capacitance $C_{DET}$ when PD 185 is connected to the network port and on $C_{DET}$, $C_{PSE}$, and $C_{CABLE}$ when PD 185 is not connected to the network port. Accordingly, $C_{DET}$ may be thought of as the "signal" capacitance (PD 185 present) and $C_{PSE}$ and $C_{CABLE}$ as the "noise" capacitance (PD 185 not present) The values of coupling capacitor $C_{DET}$ 150, PSE's bypass capacitor $C_{PSE}$, and the peak voltage of the time-varying voltage signal are selected to ensure that when no PD is present at the network connection, the sensed peak current results in an AC impedance that is well above the PoE standard requirement of 27 kΩ.

Additionally, the ratio between $C_{DET}$ and $C_{PSE}$ is selected to achieve a "signal-to-noise" capacitance ratio that will meet the PoE standard requirement that AC disconnect sensing circuit 175 operate at less than 500 Hz, thus slewing the network port voltage to less than 100 V/ms and 4.4 V peak-to-peak. To meet this low slew rate and low frequency signal requirement, coupling capacitor 215 must be close to 1 µF and be able to handle 60 V of DC bias.

As described hereinabove with reference to FIG. 3, choosing for example peak-to-peak voltage at 6 V, PSE's bypass capacitance at 0.1 µF, coupling capacitance at 0.5 µF, and estimating the cable capacitance at 0.05 µF will result in a peak current flowing through the coupling capacitor to be approximately 0.22 mA when no PD is connected to the network port and approximately 0.9 mA when a PD is connected to the network port. At these values, the AC impedance of the network port will therefore be above the 27 kΩ threshold set by the PoE standard when no PD is connected to the network port and below the 27 kΩ when a PD is connected to the network port.

It should be understood by one skilled in the art that additional resistors, capacitors, transistors, and diodes may be placed between PSE 180 and network cables 190*a-b* or between PD 185 and network cables 190*a-b* as specified by the PoE standard. It should also be understood by one skilled in the art that the peak current may be sensed at any one of current sensing points 202*a-d*.

Figure 5:
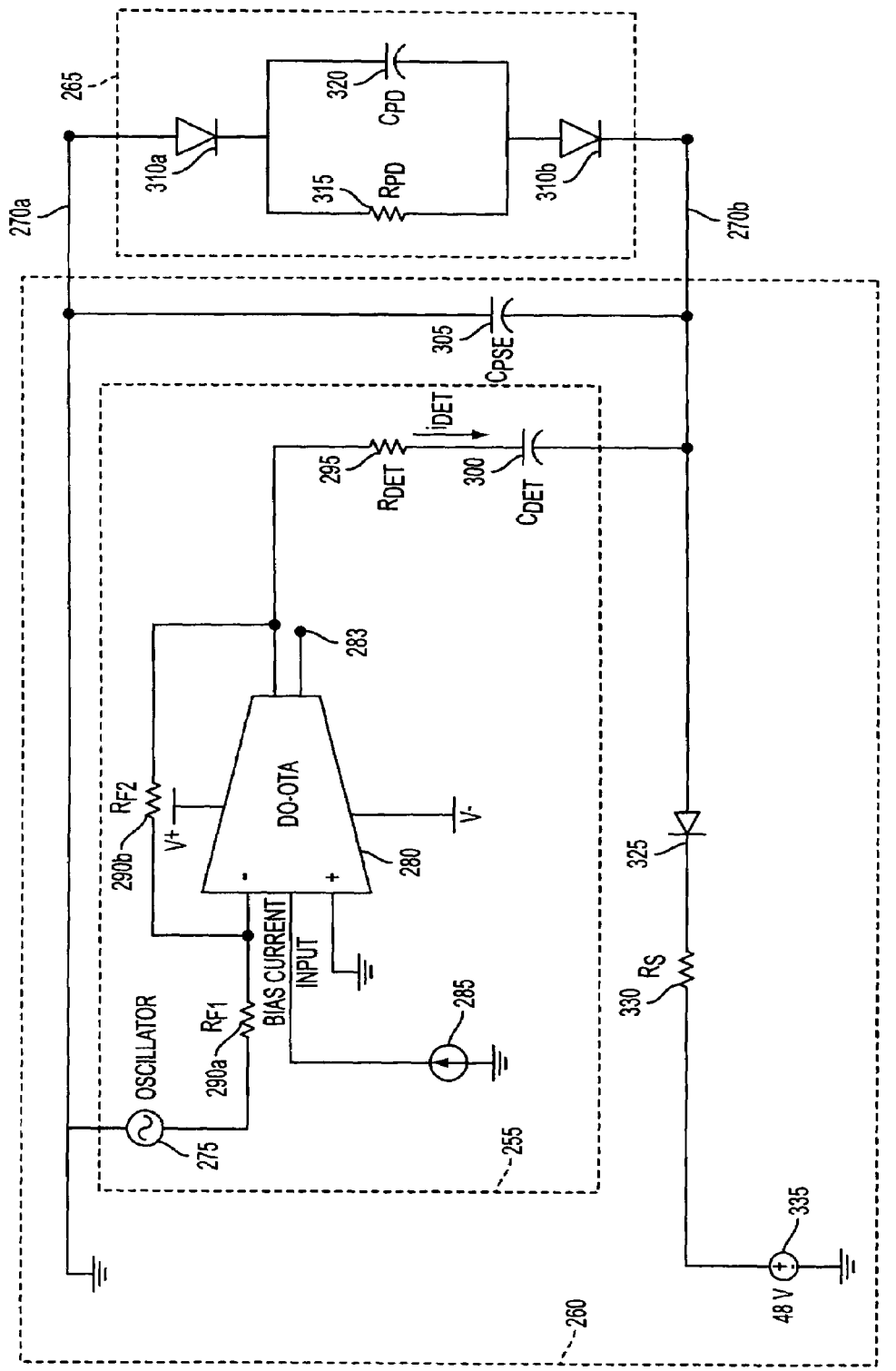
FIG. 5 is an illustrative diagram showing an exemplary implementation of the AC disconnect sensing circuit of FIG. 3 as connected to a powered network connection.

Referring now to FIG. 5, an illustrative diagram of another exemplary implementation of the AC disconnect sensing circuit of FIG. 3 connected to a powered network connection is described. AC disconnect sensing circuit 255 is implemented using DO-OTA 280 as analog amplifier 140 shown in FIG. 3. DO-OTA 280 has secondary output 283 that may be readily interfaced to other circuits and that detects when the impedance of the connection exceeds a threshold set above 27 kΩ, thereby indicating when a PD has been unplugged from the connection.

Figure 6:
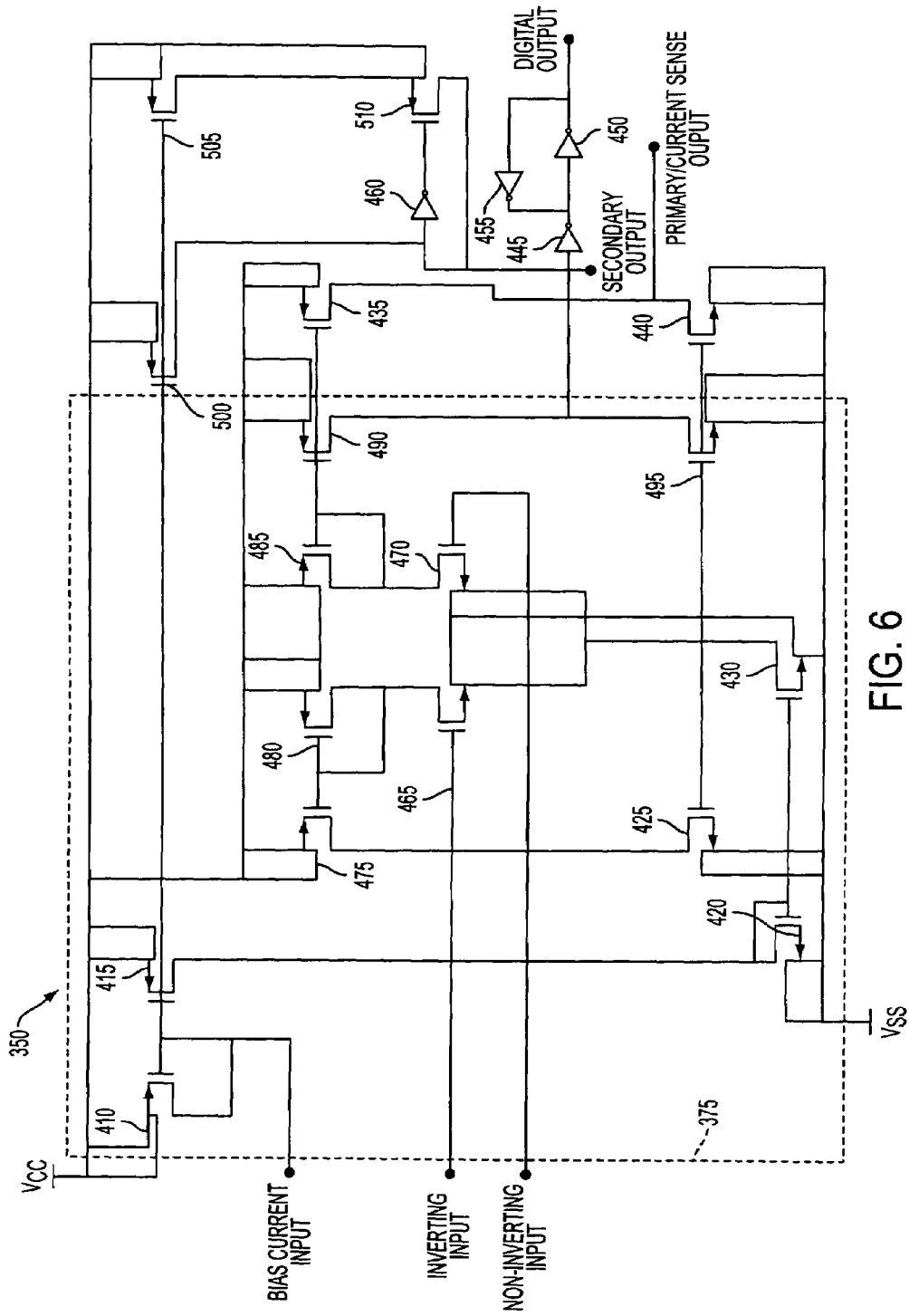
FIG. 6 is an illustrative diagram of a DO-OTA amplifier for use with the AC disconnect sensing circuit of FIG. 5.

As described hereinabove with reference to FIG. 3, the impedance of the connection is determined by sensing the peak current flowing through coupling capacitor 300. DO-OTA 280 implements a current sensing method equivalent to sensing at current sensing point 202*a* in FIG. 4. The result of this current sensing is available at DO-OTA 280's secondary output 283. As shown in FIG. 6, secondary output 283 may be loaded with a test current, thus providing a digital current sensing result. Peak current is preferably sensed when coupling diode 325 is reverse biased to enable AC disconnect sensing circuit 255 to disregard the PSE's output impedance and the coupling diode impedance when determining the AC impedance of the network port. When coupling diode 255 is reverse biased, it becomes an open circuit with near-zero impedance thereby enabling the peak current flowing through coupling capacitor 300 to depend only on the coupling capacitance and on the cable and PSE's bypass capacitance (305).

Referring now to FIG. 6, an illustrative diagram of a dual-output operational trans-conductance amplifier for use with the AC disconnect sensing circuit of FIG. 5 is described. Dual-output operational trans-conductance amplifier ("DO-OTA") 350 is designed based on single-output operational trans-conductance amplifier ("OTA") 375. OTA 375 converts a differential input voltage applied into its inverting and non-inverting inputs into a differential output current through its trans-conductance g. A bias current input is provided to modulate the value of g so that g is proportional to the bias current $I_{bias}$ applied at the bias current input.

The voltage-to-current conversion occurs by pair of common source/common emitter MOS/bipolar transistors 465-470. The differential current generated by transistors 465-470 is replicated and amplified by additional transistors 480-485 and 490-495 and then presented at the primary/current sense output of OTA 375. The output current that is generated is given by $I_{OUT}=g\,\Delta V$, where $\Delta V$ is the differential input voltage, making OTA 375 a voltage-controlled current source. An example of OTA 375 includes the OTA in the LT1228 part sold by Linear Technology Corporation, of Milpitas, Calif.

By taking advantage of the current replication or mirroring that occurs within OTA 375, DO-OTA 350 may be designed with additional transistor pair 435-440. Additional transistor pair 435-440 is driven by the same input voltage signal that controls transistor pair 465-470 that performs the voltage-to-current conversion. The current in additional transistor pair 435-440 may be identical to the current in the primary output if the transistors in additional transistor pair 435-440 are of the same size as the transistors in transistor pair 465-470 that performs the voltage-to-current conversion. By altering the size of the transistors in additional transistor pair 435-440 in relation to the size of transistors 465-470, a current proportional to the output current may be generated at the secondary output.

The secondary output indicates whether the amount of current required to drive the amplified time-varying voltage signal applied into DO-OTA 350 inputs into the network load formed by coupling capacitor 300, PSE bypass capacitance 305, the network cable capacitance, and PD 265 is higher than a threshold current corresponding to the threshold AC impedance set above 27 kΩ. The threshold current is applied into the bias current input.

If the secondary output sinks less than the threshold current, that is, if a current lower than the threshold current is required to drive the time-varying voltage signal into the network load thereby indicating that the AC impedance of the network port is higher than the threshold AC impedance set above 27 kΩ, the voltage at the secondary output is pulled up by the threshold current. When the secondary output voltage is pulled up, a one-bit digital voltage having a value of '1' will be set at the digital output to indicate that PD 265 has been disconnected from the network. Otherwise, when the secondary output sinks less than the threshold current, the voltage at the secondary output is pulled down by the threshold current and the digital output will be set to '0' to indicate that PD 265 is connected to the network. It should be understood by one skilled in the art that a multi-bit digital voltage output may also be provided to indicate that PD 265 has been disconnected from the network.

DO-OTA 350 has the advantages of requiring few transistors and providing AC disconnect sensing for a PSE with a digital voltage that can readily be interfaced to other circuits used in a powered network connection.

Although particular embodiments of the present invention have been described above in detail, it will be understood that this description is merely for purposes of illustration. Specific features of the invention are shown in some drawings and not in others, for purposes of convenience only, and any feature may be combined with other features in accordance with the invention. Steps of the described processes may be reordered or combined, and other steps may be included. Further variations will be apparent to one skilled in the art in light of this disclosure and such variations are intended to fall within the scope of the appended claims.

What is claimed is:

1. A circuit for detecting the presence of a powered device in a powered network connection, the circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit,
   wherein the analog amplifier circuit comprises a dual-output trans-conductance amplifier, the dual-output trans-conductance amplifier comprising:
   an inverting input;
   a non-inverting input;
   a bias current input;
   a primary output; and a secondary output.

2. The circuit of claim 1, wherein the current in the primary output is proportional to the current in the secondary output.

3. The circuit of claim 1, wherein the secondary output is connected to an inverter network to provide a digital voltage at a current sensing output.

4. The circuit of claim 3, wherein the digital voltage indicates the presence of the powered device in the powered network connection.

5. A circuit for detecting the presence of a powered device in a powered network connection, the circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit,
   wherein the time-varying voltage signal from the oscillator is applied at the inverting input of the analog amplifier circuit.

6. A circuit for detecting the presence of a powered device in a powered network connection, the circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit,
   wherein the time-varying voltage signal from the oscillator is applied at the non-inverting input of the analog amplifier circuit in a non-inverting analog amplifier configuration.

7. The circuit of claim 1, wherein the bias current input comprises a current source to provide a threshold current at the secondary output.

8. A circuit for detecting the presence of a powered device in a powered network connection, the circuit comprising:
   an oscillator for providing a time-varying voltage signal;
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit;
   a first feedback resistor connected between the primary output and the inverting input; and
   a second feedback resistor connected between the oscillator and the inverting input.

9. The circuit of claim 1, wherein the dual-output trans-conductance amplifier comprises a pair of common source MOS transistors to convert the time-varying voltage signal into a differential current.

10. The circuit of claim 1, wherein the dual-output trans-conductance amplifier comprises a pair of common emitter bipolar transistors to convert the time-varying voltage signal into a differential current.

11. A circuit for detecting the presence of a powered device in a powered network connection, the circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing though a coupling capacitor required to drive a load connected to the analog amplifier circuit,
   wherein the circuit is a component within a power sourcing equipment in the powered network connection.

12. The circuit of claim 11, wherein the power sourcing equipment provides power to a powered device connected to the powered network connection.

13. The circuit of claim 11, wherein the power sourcing equipment removes power from the powered network connection when the digital voltage indicates that the powered device has been disconnected from the powered network connection.

14. A circuit for detecting the presence of a powered device in a powered network connection, the circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit,
   wherein the load comprises a coupling capacitor connected to the powered device in the powered network connection.

15. The circuit of claim 14, wherein the load further comprises a coupling resistor connected to the coupling capacitor.

16. A power sourcing equipment for providing power to a powered network connection, the power sourcing equipment comprising:
   an AC disconnect circuit for detecting the presence of a powered device in a powered network connection, the AC disconnect circuit comprising:
   an oscillator for providing a time-varying voltage signal; and
   an analog amplifier circuit for receiving the time-varying voltage signal from the oscillator as an input, applying the time-varying voltage signal to the powered network connection, and sensing the current flowing through a coupling capacitor required to drive a load connected to the analog amplifier circuit.

17. The power sourcing equipment of claim 16, wherein the power sourcing equipment comprises one or more of: a network hub; a repeater; a switch; a router; and a data terminal equipment.

18. The power sourcing equipment of claim 16, wherein the powered network connection comprises a powered Ethernet connection.

19. The power sourcing equipment of claim 16, wherein the powered device comprises one or more of: a cell phone charger; a VOIP phone; a wireless access point; a portable computer docking station; a HVAC thermostat; and a network camera.

20. The power sourcing equipment of claim 16, wherein the analog amplifier circuit comprises an operational amplifier, a buffer amplifier, a single-output trans-conductance amplifier or a dual-output trans-conductance amplifier.

21. The power sourcing equipment of claim 20, wherein the dual-output trans-conductance amplifier comprises:
   an inverting input;
   a non-inverting input;

a bias current input;
a primary output; and
a secondary output.

22. The power sourcing equipment of claim 16, wherein the current in the primary output is proportional to the current in the secondary output.

23. The power sourcing equipment of claim 21, wherein the secondary output is connected to an inverter network to provide a digital voltage at a digital output.

24. The power sourcing equipment of claim 21, wherein the power sourcing equipment removes power from the powered network connection when the digital output indicates that the powered device has been disconnected from the powered network connection.

25. The power sourcing equipment of claim 16, wherein the time-varying voltage signal from the oscillator is applied at the inverting input of the dual-output trans-conductance amplifier.

26. The power sourcing equipment of claim 21, wherein the bias current input comprises a current source to provide a threshold current at the secondary output.

27. A method for detecting the presence of a powered device in a powered network connection and removing power from the powered network connection when the powered device is disconnected from the powered network connection, the method comprising:
  detecting a valid powered device signature in the powered network connection;
  supplying power to the powered network connection if a valid powered device signature is detected;
  applying a time-varying voltage signal into the powered network connection;
  converting the time-varying voltage signal into a current with an analog amplifier circuit; and
  measuring the impedance of the powered network connection by sensing the current flowing through a coupling capacitor connected to the analog amplifier circuit.

28. The method of claim 27, wherein the powered device comprises one or more of: a cell phone charger; a VOIP phone; a wireless access point; a portable computer docking station; a HVAC thermostat; and a network camera.

29. The method of claim 27, wherein the powered network connection comprises a powered Ethernet connection.

30. The method of claim 27, wherein supplying power to the powered network connection comprises providing a power sourcing equipment.

31. The method of claim 30, wherein the power sourcing equipment comprises one of more of: a network hub; a repeater; a switch; a router; and a data terminal equipment.

32. The method of claim 27, wherein applying a time-varying voltage signal into the powered network connection comprises providing an oscillator in the power sourcing equipment.

33. The method of claim 27, wherein converting the time-varying voltage signal into a current with an analog amplifier circuit comprises applying the time-varying voltage signal in the inverting input of the analog amplifier circuit.

34. The method of claim 27, wherein the analog amplifier circuit comprises an operational amplifier, a buffer amplifier, a single-output trans-conductance amplifier, or a dual-output trans-conductance amplifier.

35. The method of claim 27, wherein converting the time-varying signal into a current with an analog amplifier circuit comprises providing a pair of common source MOS transistors in the analog amplifier circuit.

36. The method of claim 27, wherein converting the time-varying signal into a current with an analog amplifier circuit comprises providing a pair of common emitter bipolar transistors in the dual-output trans-conductance amplifier.

37. The method of claim 27, wherein converting the time-varying signal into a current with an analog amplifier circuit comprises providing a primary output and a secondary output in the dual-output trans-conductance amplifier, wherein the current at the primary output is proportional to the current in the secondary output.

38. The method of claim 27, wherein sensing the current generated by the analog amplifier circuit comprises sensing the current at any one of: the primary output of the analog amplifier circuit; the input of the analog amplifier circuit; and the power supply inputs of the analog amplifier circuit.

* * * * *